United States Patent [19]
Shaw

[11] Patent Number: 4,564,262
[45] Date of Patent: Jan. 14, 1986

[54] FIBER OPTIC DIRECTIONAL COUPLER

[75] Inventor: Herbert J. Shaw, Stanford, Calif.

[73] Assignee: Board of Trustees of the Leland Stanford Junior University, Stanford, Calif.

[21] Appl. No.: 522,108

[22] Filed: Aug. 11, 1983

Related U.S. Application Data

[62] Division of Ser. No. 139,511, Apr. 11, 1980, Pat. No. 4,493,528.

[51] Int. Cl.[4] .............................................. G02B 5/172
[52] U.S. Cl. .................................. 350/96.15; 156/153; 350/320
[58] Field of Search ............... 350/96.15, 96.16, 96.20, 350/96.21, 320; 65/61; 51/283 R; 156/153, 154; 356/350

[56] References Cited

U.S. PATENT DOCUMENTS

| | | | |
|---|---|---|---|
| 4,021,097 | 5/1977 | McMahon | 350/96.15 |
| 4,136,929 | 1/1979 | Suzaki | 350/96.15 |
| 4,259,016 | 3/1981 | Schiffner | 356/350 |
| 4,301,543 | 11/1981 | Palmer | 455/612 |
| 4,302,071 | 11/1981 | Winzer | 350/96.20 |
| 4,307,933 | 12/1981 | Palmer et al. | 350/96.16 |
| 4,315,666 | 2/1982 | Hicks, Jr. | 350/96.15 |

FOREIGN PATENT DOCUMENTS

| | | |
|---|---|---|
| 2812346 | 9/1978 | Fed. Rep. of Germany . |
| 52-14430 | 2/1977 | Japan . |
| 52-24539 | 2/1977 | Japan . |
| 53-91752 | 8/1978 | Japan . |
| 54-4153 | 1/1979 | Japan . |
| 54-101334 | 8/1979 | Japan . |
| 54-118255 | 9/1979 | Japan . |

OTHER PUBLICATIONS

Hsu et al., "Single Mode Optical Fiber Pickoff Coupler", *Applied Optics*, vol. 15, No. 10, Oct. 1976, pp. 2310–2312.

Journal of The Optical Society of America, vol. 58, No. 9, pp. 1176–1183; Sep. 1968; "Coherent Interactions Between Optical Waveguides and Lasers" by N. S. Kapany, J. J. Burke, K. L. Frame, and R. W. Wilcox.

"Fabrication of Low-Loss 3 db Couplers With Multimode Optical Fibres", *Electronics Letters*, vol. 14, No. 5, Mar., 1978, pp. 157–158, Tsujimoto et al.

"Single-mode fiber-optical power divider: encapsulated etching technique", S. K. Sheem et al., *Optics Letters*, Jan., 1979, vol. 4, No. 1, pp. 29–31.

"Single mode fiber optic directional coupler", *Electronics Letters*, vol. 16, No. 7, Mar. 27, 1980, Shaw et al., pp. 260–261.

*Primary Examiner*—John Lee
*Attorney, Agent, or Firm*—Knobbe, Martens, Olson & Bear

[57] ABSTRACT

Apparatus and method of manufacture for coupling optical power between two strands of fiber optic material in a given direction of propagation. The coupler employs generally parallel, intersecting strands of fiber optic material having the cladding removed on one side thereof to within a few microns of the fiber cores in the region of intersection to permit light transfer between the strands.

28 Claims, 7 Drawing Figures

FIBER OPTIC DIRECTIONAL COUPLER

This application is a division of application Ser. No. 139,511 filed Apr. 11, 1980 now U.S. Pat. No. 4,493,528.

This invention pertains generally to fiber optic systems and more particularly to a device for coupling optical power between two strands of fiber optic material in a given direction of propagation.

Fiber optic systems are finding increasingly wide use for transmitting information in a number of fields. In communications, for example, fiber optic strands are utilized in place of copper wires in telephone cables. Fiber optics are also being used in data processing systems, other signal processing systems, and interferometric sensing systems. Fiber optics have a number of advantages over conventional wire conductors, such as small size, lower cost, less susceptability to interference and higher transmission efficiency.

Most fiber optic systems in use today employ multimode propagation because such systems are easier and less expensive to implement than single mode systems. Single mode systems, however, offer advantages such as greater information capacity and better coherence, and it is expected that single mode systems will be utilized more widely in the future.

In both multimode and single mode fiber optic systems, it is sometimes necessary to couple optical power between two fibers or strands. In multimode systems, this is relatively easy because of the relatively large (60 microns) core size of multimode fibers. In single mode systems, however, coupling is more difficult because of the relatively small core size (on the order of 10–15 microns or less) of the fibers.

Heretofore, there have been some attempts to provide directional couplers for single mode fiber optic systems. These have included micro-optic couplers in which wave guides are formed in planar substrates, and so called "bottle couplers" in which two fibers are twisted together in a glass tube and etched to remove the cladding. Each of these couplers, however, has certain limitations and disadvantages. Micro-optic couplers have relatively high input and output coupling losses and internal losses, and they tend to be sensitive to the polarization of the light being transmitted. Bottle couplers are mechanically unstable, fragile, and have a moderately high throughput loss.

Another type of coupler heretofore employed in single mode fiber optic systems is an end face coupler in which two fibers are cut at an angle and brought together along a diametric line at one end of the fibers. These two fibers butt against the end of a third fiber to form a three port device or power splitter.

There have also been some attempts to make a single mode directional coupler by removing a portion of the cladding from two generally parallel single mode fibers in order to bring the cores close enough together to transfer light between the strands. However, to the best of applicants' knowledge, no one prior to the present invention has been able to build a successful coupler for single mode operation utilizing this technique.

It is in general an object of the invention to provide a new and improved fiber optic directional coupler and method of manufacture.

Another object of the invention is to provide a coupler of the above character which can be employed in a single mode fiber optic system as well as in multimode systems.

Another object of the invention is to provide a coupler of the above character in which the degree of coupling between two fiber optic strands can be adjusted over a relatively wide range.

Another object of the invention is to provide a coupler of the above character which has a relatively low throughput loss.

Another object of the invention is to provide a coupler of the above character which has a high degree of directivity.

Another object of the invention is to provide a coupler of the above character which has operating characteristics which are substantially independent of the polarization of the light being transmitted.

Another object of the invention is to provide a coupler of the above character which is mechanically stable and durable.

These and other objects are achieved in accordance with the invention by removing the material on one side of each of two fiber optic strands, and positioning the strands so that the two strands are aligned, with the cut away portions of the cladding facing each other and the distance between the core portions of the strands is within a predetermined critical zone which, for single mode fibers, is typically less than a few (e.g. 2–3) core diameters. The amount of coupling can be varied by adjusting the relative positions and/or orientations of the strands. In one disclosed embodiment, each strand is mounted in a slot of varying depth in the generally planar face of a block, and material is removed simultaneously from the block and the strand until the desired amount of fiber optic material has been removed. In another embodiment, a plurality of strands are mounted side-by-side on the curved surfaces of two blocks, and the cladding material is removed simultaneously from the outer sides of the strands on each block to form the desired interaction regions.

Figure 1:
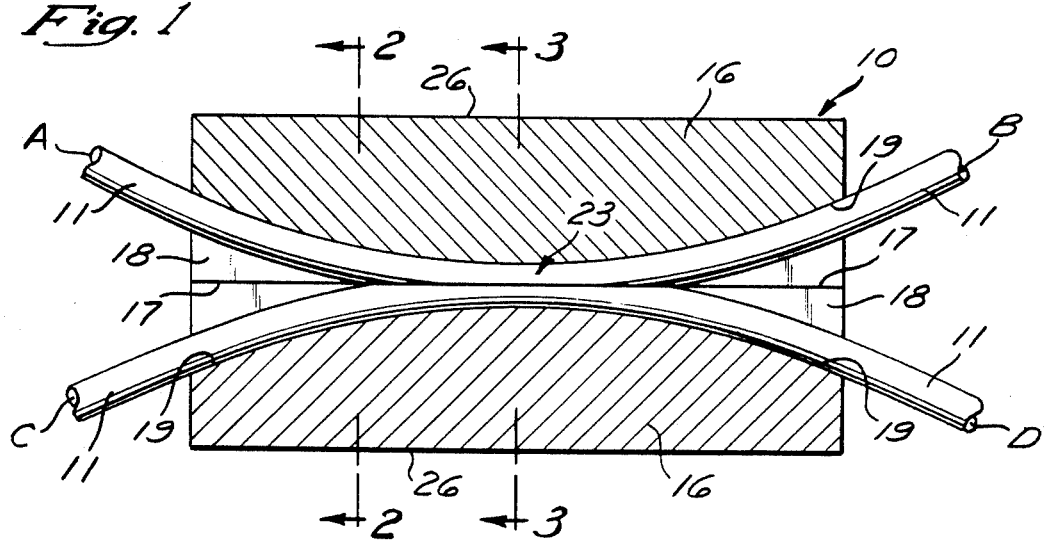
FIG. 1 is a centerline sectional view, somewhat schematic, of one embodiment of a coupling device according to the invention.
Figure 2:
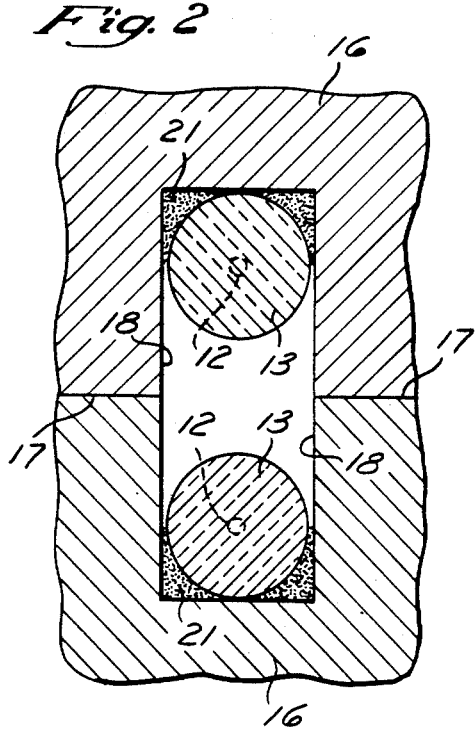
FIG. 2 is an enlarged fragmentary cross-sectional view, somewhat schematic, taken along line 2—2 in FIG. 1.
Figure 3:
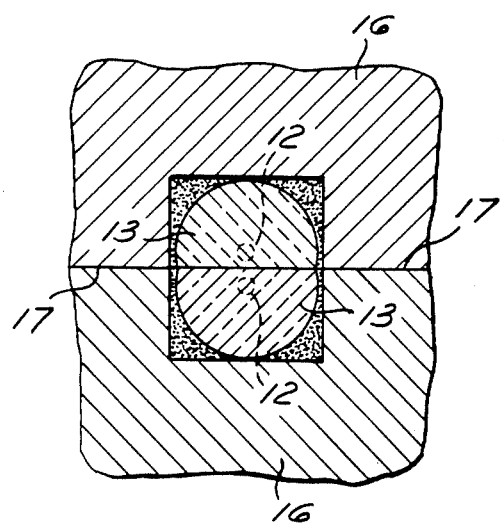
FIG. 3 is an enlarged fragmentary view, somewhat schematic, taken along line 3—3 in FIG. 1.
Figure 4:
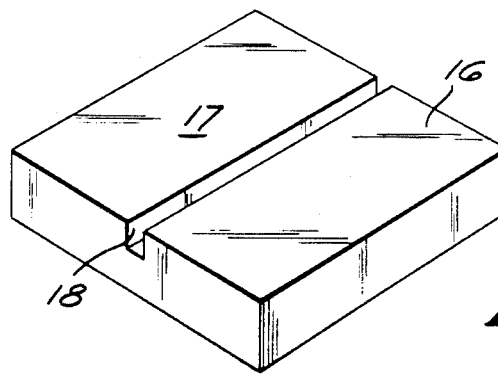
FIG. 4 is an isometric view of one of the blocks on which the fiber optic strands are mounted in the embodiment of FIG. 1.

As illustrated in FIGS. 1–4, the coupler 10 includes two strands 11 of a single mode fiber optic material. Each strand comprises a single fiber of quartz glass which is doped to have a central core portion 12 and an outer cladding 13. For single mode operation, the core typically has a diameter on the order of 10–15 microns or less, and the cladding has a diameter on the order of 125 microns. In FIG. 1 the diameter of the strands is exaggerated for clarity of illustration, and in FIGS. 2–3 the diameter of the core is likewise exaggerated. While this particular embodiment employs single mode fibers having a step gradient, the invention is not limited to such fibers and can be employed advantageously with other fibers, e.g., fibers having a more complex w-type doping and graded index multimode fibers.

Strands 11 are affixed to bases or blocks 16 having optically flat confronting faces or surfaces 17. The strands are mounted in slots 18 which open through the confronting faces, and they extend along generally parallel, intersecting paths defined by the inner or bottom walls 19 of the slots. The primary function of the bases is to hold the strands, and the bases can be fabricated of any suitable rigid material. In one presently preferred embodiment, the bases comprise generally rectangular blocks of fused quartz glass approximately one inch long, one inch wide and one-quarter inch thick, and slots 18 are aligned with the sagittal planes of the blocks. In this embodiment, the fiber optic strands are secured in the slots by suitable cement 21 such as epoxy glue. One advantage of the fused quartz blocks is that they have a coefficient of thermal expansion similar to that of glass fibers, and this advantage is particularly important if the blocks and fibers are subjected to any heat treatment during the manufacturing process. Another suitable material for the blocks is silicon, which also has excellent thermal properties for this application.

Slots 18 are deeper toward the edges of the blocks than toward the center. With one of the blocks mounted on the other in an inverted position, both the bottom walls of the slots and the strands mounted in the slots converge toward the centers and diverge toward the edges of the blocks. In the embodiment illustrated, bottom walls 19 are arcuately curved along their length, but they can have any other suitable contour, preferably one which provides gradual covergence and divergence of the fiber optic strands with no sharp bends or abrupt changes in direction. In the schematic illustration of the drawings, the bottom walls are illustrated as being flat in cross section. However, they may be curved or have any other desired cross section.

Toward the centers of the blocks, the depth of slots 18 is less than the diameter of strands 11, and the outer portions of the fiber optic material are removed evenly with surface 17. At the edges of the blocks, the depth of the slots is preferably at least as great as the diameter of the strands so that none of the cladding is removed at these points. Thus, the amount of fiber optic removed increases gradually from zero toward the edges of the blocks to a maximum toward the centers of the blocks. Removal of the material permits each core to be positioned within the evanescent field of the other whereby light is transferred between the two fibers. The evanescent fields extend into the cladding and decrease rapidly with distance outside the core in which they originate. The tapered removal of material enables the fibers to converge and diverge gradually, and this is important in avoiding backward reflection and excess loss of the incident light energy.

Applicants have discovered that the amount of material removed must be carefully controlled to provide proper coupling between the fiber optic strands. If too little cladding is removed, the strands cannot be brought close enough together, and insufficient coupling will result. If too much material is removed, the propagation characteristics of the fibers will be altered, and improper operation will result, e.g. back reflection and loss of light energy. When the spacing between the core portions of the strands is within a certain predetermined "critical zone", however, each of the strands receives a significant portion of the evanescent energy from the other strand, and optimum coupling is achieved without the undesirable effects associated with removal of too little or too much of the fiber optic material.

The extent of the critical zone for a particular coupler is dependent upon a number of interrelated factors such as the parameters of the fiber itself and the geometry of the coupler, and with single mode fiber optic strands having a step index gradient, the critical zone can be quite narrow. In a single mode coupler of the type shown in FIGS. 1-4, for example, the required center-to-center spacing between the strands at the center of the coupler is typically less than a few (e.g. 2-3) core diameters.

An interaction region 23 is formed at the junction of the strands, and in this region light is transferred between the two strands. The amount of light transferred is dependent upon the proximity and orientation of the cores, as well as the length of the region of interaction. The length of that region is, in turn, dependent upon the radius of curvature of bottom walls 19 and the spacing between the cores. In one presently preferred embodiment employing an edge-to-edge core spacing on the order of magnitude of the core diameter, the radius of curvature is on the order of 1 meter, and the interaction region is approximately 2.5 millimeters long. With these dimensions, the light makes only one transfer between the strands as it travels through the interaction region. However, if desired, a longer interaction region can be employed, in which case the light will transfer back and forth between the two strands as it travels through the region. These additional transfers can provide increased sensitivity to motion for some types of switching, e.g. translation or acoustic. If desired, the length of the interaction region can be increased without increasing the number of transfers if the separation between the cores is increased by a corresponding amount.

A film of fluid (not shown) is provided between the confronting surfaces of block 16. This fluid serves the dual function of matching refractive indexes and preventing the optically flat surfaces of the blocks from becoming permanently locked together.

The amount of coupling between the fibers is adjusted by changing the relative positions and/or orientations of the fiber cores in the interaction region. The primary adjustment is provided by translating the blocks in a direction perpendicular to the axis of the fibers. Additional adjustments can be made by translating the blocks in a direction parallel to the fiber axis and by rotating the blocks about an axis perpendicular to the fiber axis. One of the blocks can be mounted in a fixed position, and the other can be mounted on a carriage having micrometer screws for making the translational and rotational adjustments.

The coupler has four ports labelled A-D in FIG. 1, with ports A, B at opposite ends of one of the fibers and ports C, D at opposite ends of the other fiber. In the following discussion, it is assumed that input light of suitable wavelength (e.g. 1.15 micron) is applied to port A. This light passes through the coupler and is delivered to port B and/or port D, depending upon the coupling ratio for which the coupler is set.

The coefficient of coupling is defined as the ratio of power at output port D to the power at input port A. In one example of a coupler having the dimensions given above, as much as 85% of the input power at port A has been observed to be delivered to port D. In principle, however, 100% coupling is possible, and the amount of coupling can be adjusted to any desired value between zero and the 100% maximum. Thus, the coupler has a high, widely adjustable coefficient of coupling.

The coupler also has a very low throughput loss and very good directivity. The throughput loss in the above example is less than 0.2 db. The directivity is defined as the ratio of the power at port D to the power at port C, with the input applied to port A. With this coupler, the power at port D is greater than 60 db above the power at port C. Thus, substantially all of the power applied to input port A is delivered to the output ports B and D.

The coupler also has excellent polarization response in that it will pass light of any polarization almost equally well. Thus, the characteristics of the coupler are substantially independent of polarization.

In one presently preferred method of manufacture, the coupler of FIGS. 1-4 is made by first grinding the opposite faces 17, 26 of blocks 16 flat and parallel. Slots 18 are then cut through faces 17 to a uniform depth greater than the diameter of the fiber optic strands. The bottom walls of the slots are then shaped to provide the desired contour.

The shaping is preferably such that the depth of the slots at the edges of the blocks is at least one half of a fiber core diameter greater than the depth at the centers of the slots.

Once the slots have been formed, epoxy glue 21 is placed therein, and strands 11 are placed in the slots with the glue. Weights are then attached to the ends of the strands to tension the strands and draw them tightly against the bottom walls of the slots. The entire assembly is then heated in an oven to cure the glue, typically at a temperature on the order of 70° C. for about 10 hours. With the epoxy glue, it is very important that the heat be applied and removed gradually in order to prevent breakage of the fibers within the slots. This can be accomplished by placing the blocks in the oven before it is energized and leaving them in the oven until it has cooled down to room temperature after the heating process. When the heating is completed, the weights are removed to release the tension in the fibers.

Once the fibers have been mounted in the slots, faces 17 are lapped parallel to faces 26 until they intersect the cladding of the fibers, forming elongated oval shaped flat surfaces on the outer sides of the fibers. The widths of these oval shaped areas are measured to determine the positions of the fibers relative to block surfaces 26, and thereafter these surfaces serve as references for locating the core portions of the fibers. By measuring the lengths of the oval shaped areas at different depths of cuts, the radii of curvature of the fibers can be determined. The lapping process continues until the cladding has been removed to within about 3 microns of the desired distance from the cores, as determined by direct measurement of the thickness of the blocks. The final three microns are removed by polishing.

The polished surfaces of the blocks are then placed together, with the cut-away portions of the fibers facing each other. The confronting faces of the blocks are separated by a distance on the order of 0.5 micron or less, and optical oil is introduced between the blocks by capillary action.

In the embodiment heretofore described, slots 18 are formed by cutting into the surfaces of the blocks. It should be understood, however, that the slots can be formed by other means such as building up areas on the blocks or joining two or more blocks together and that the slots can have other shapes, e.g. V-grooves. Likewise, techniques other than cementing might be employed to bond the fibers to the blocks, e.g. indium bonding. Similarly, the material can be removed from the blocks and the cladding by other suitable techniques, such as etching and photolithography.

Figure 5:
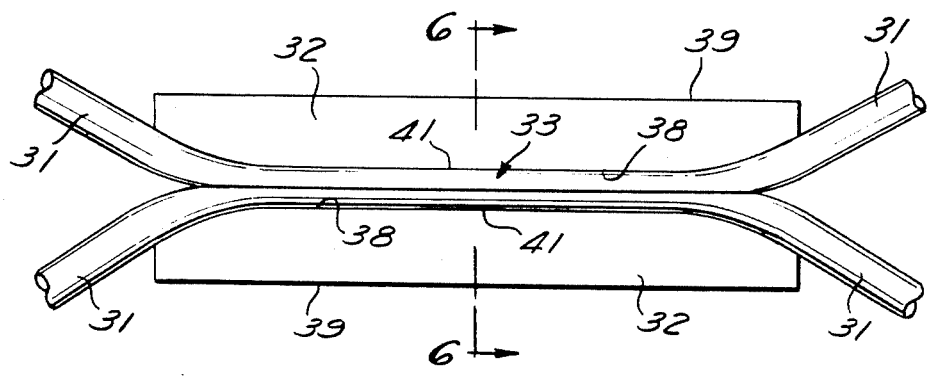
FIG. 5 is a side elevational view, somewhat schematic, of a second embodiment of a coupling device according to the invention.
Figure 6:
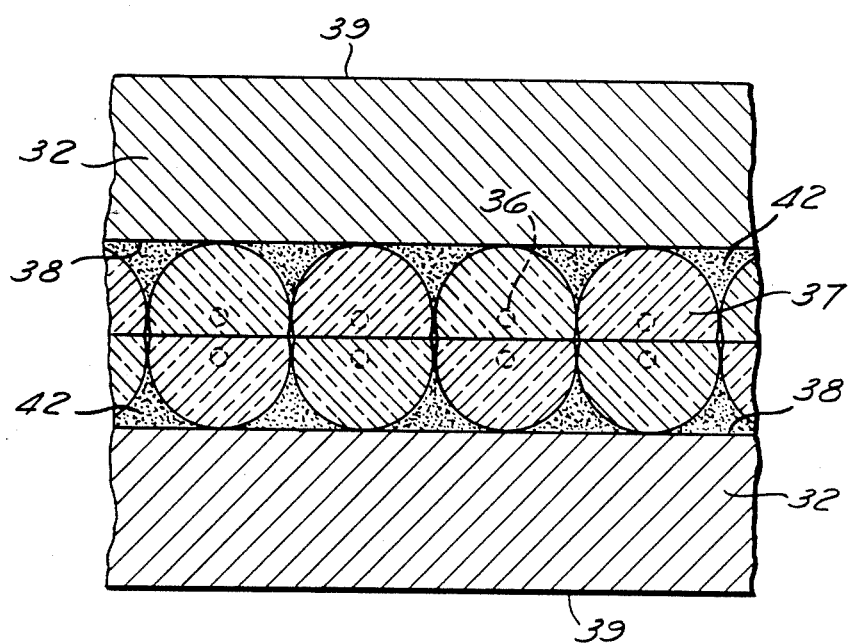
FIG. 6 is a cross-sectional view, somewhat schematic, taken along line 6—6 in FIG. 5.

In the embodiment of FIGS. 5-6, a plurality of fiber optic strands 31 similar to strands 11 are affixed to bases or blocks 32 and positioned to provide a plurality of interaction regions 33 between corresponding pairs of the strands on the two blocks. In this embodiment, the cores of the fibers are designated by the reference numeral 36, and the claddings are designated 37.

As illustrated, bases 32 comprise generally rectangular blocks of quartz or other suitable rigid material having confronting faces or surfaces 38 and outer faces or surfaces 39. The central portions 41 of surfaces 38 are planar and parallel to surfaces 39, and toward the edges of the blocks surfaces 38 curve away from central portions 41. The length of interaction regions 33 is determined by the length of planar central portions 41 and the radius of curvature of the end portions of surfaces 38, as well as the core spacing of the fibers.

Fibers 31 are mounted on surfaces 38 and affixed thereto by suitable means such as epoxy glue 42, or other suitable cement. As in the embodiment of FIGS. 1-4, the material on the outer sides of the fibers is removed gradually from zero toward the edges of the blocks to within the critical zone toward the centers of the blocks by lapping and polishing in a direction parallel to surfaces 38, 39.

Operation and use of the embodiment of FIGS. 5-6 is similar to that of the coupler in FIGS. 1-4, and the amount of coupling between the aligned pairs of strands on the two blocks can be adjusted by translation and rotation of the blocks.

In one presently preferred method of manufacture for the coupler of FIGS. 5-6, the surfaces of blocks 32 are first ground flat and parallel. Thereafter, the desired curvatures are formed toward the outer edges of surfaces 38. The glue is then applied to the contoured surfaces, and the fiber optic strands are placed on the blocks and pressed against surfaces 38 while the glue cures. If heating is required to cure the glue, the heat should be applied and removed gradually to avoid breakage of the fibers.

When the glue is cured, the material on the outer sides of the strands is removed by lapping and polishing in a direction parallel to surfaces 38, 39. The distance between the lapped and polished surfaces and the cores of the fibers is determined by measurement of the distances between these surfaces and outer surfaces 39. Removal of the material in this manner provides a gradual tapering of the fibers into and out of the interaction regions. In this embodiment, the adjacent fibers on each block provide lateral support for each other and serve as a guide in the grinding and polishing steps.

When the desired amount of material has been removed, the blocks are superposed with surfaces 38 facing each other and the corresponding strands on the two blocks aligned to form a plurality of coupler pairs.

Figure 7:
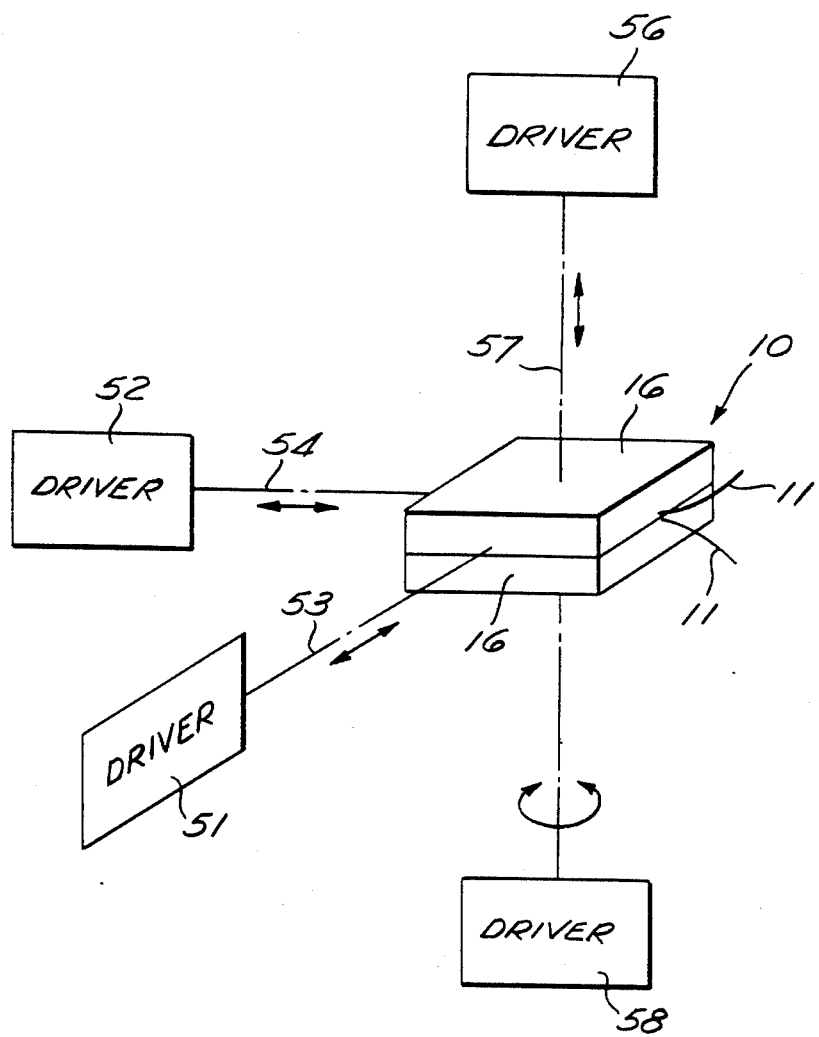
FIG. 7 is a block diagram of a dynamically variable fiber optic coupler utilizing a coupling device of the type shown in FIGS. 1–4.

As illustrated in FIG. 7, a coupling device 10 of the type heretofore described can be utilized to provide dynamically variable coupling in a fiber optic system. In this embodiment, suitable tranducers or drivers 51, 52 are connected to upper block 16 for translating that block back and forth relative to the lower block along axes 53, 54 in directions perpendicular and parallel to the axes of the fibers. A similar transducer or driver 56 is also connected to the upper block for moving that block along an axis 57 in a direction perpendicular to axes 53, 54 to vary the spacing between the blocks. A fourth transducer 58 provides relative rotation of the blocks about axis 57. By varying the relative positions and/or orientations of the blocks and the fiber cores in the interaction region, one or more of the transducers vary the amount of coupling between the fibers in accordance with signals applied to the transducers. These transducers can be of any suitable design, including piezoelectric transducers and other known electromechanical transducers.

The system illustrated in FIG. 7 can be employed as a variable coupler in which the coefficient of coupling is controlled by voltages or other suitable control signals applied to the transducers. The system can also function as a modulator if a time varying voltage or other suitable modulation signal is applied to the transducers.

It is apparaent from the foregoing that a new and improved coupler has been provided for use in both single mode or multimode fiber optic systems. The coefficient of coupling can be adjusted over a wide range, permitting input light to be divided as desired between two output ports. The coupler has a low throughput loss and a very high directivity so that substantially all of the light input is delivered to the output ports. The operating characteristics of the coupler are substantially independent of polarization. The coupler is mechanically stable and durable so that it can be employed in a variety of environments. If adjustability is not desired, the blocks can be bonded together to provide a fixed coupler.

It is apparent from the foregoing that a new and improved fiber optic directional coupler and method of manufacture have been provided. While only certain presently preferred embodiments have been described in detail, as will be apparent to those familiar with the art, certain changes and modifications can be made without departing from the scope of the invention as defined by the following claims.

We claim:

1. A fiber optic coupler, comprising:
   a pair of single mode optical fibers, each having cladding material removed from one side thereof, to form a flat, oval area;
   means for positioning said pair of fibers to juxtapose said flat, oval areas in facing relationship with the core of each fiber within the evanescent field of the other, to form an interaction region in which evanescent field coupling occurs; and
   means for adjusting the degree of overlap of said flat, oval areas to change the coupling efficiency of said coupler.

2. A fiber optic coupler, as defined by claim 1, wherein said positioning means mounts said fibers to gradually diverge from and converge towards said juxtaposed flat, oval areas.

3. A fiber optic coupler, as defined by claim 2, wherein the throughput losses of said coupler are less than 0.2 db.

4. Apparatus for superimposing a modulating waveform on a fiber optic transmission signal, comprising:
   means for coupling said transmission signal from a first single mode optical fiber to a second single mode optical fiber, said coupling means comprising:
   means for mounting said optical fibers adjacent one another to place the core of each fiber within the evanescent field of the other to form an interaction region in which evanescent field coupling occurs; and
   means for physically moving said first and second single mode optical fibers relative to each other at said interaction region in accordance with said modulating waveform.

5. An apparatus, as defined by claim 4, wherein said moving means comprises means for laterally displacing said optical fibers.

6. An apparatus, as defined by claim 4, wherein said fibers gradually converge and diverge at said interaction region.

7. An apparatus for superimposing a modulating waveform on a fiber optic transmission signal, comprising:
   means for coupling said transmission signal from a first single mode optical fiber to a second single mode optical fiber, said coupling means comprising:
   means for mounting said optical fibers adjacent one another to place the core of each fiber within the evanescent field of the other to form an interaction region in which evanescent field coupling occurs, each of said fibers having a flat oval surface at said interaction region which at least partially overlap; and
   means for physically displacing said first and second single mode optical fibers in accordance with said modulating waveform, said displacing means varying the degree of said overlap in accordance with said modulating waveform.

8. An apparatus, as defined by claim 7, wherein said displacing means comprises a transducer.

9. In a fiber optic directional coupler: first and second strands of single mode fiber optic material having the outer cladding removed gradually from zero to within a few microns of the core portion longitudinally on one side thereof, first and second bases to which the respective strands are rigidly affixed, and means positioning the bases together with the portions of the strands where the cladding has been removed in close facing relationship to form a region of interaction in which guided modes of the first and second strands interact through their evanescent fields to cause light to be transferred between the core portions of the strands.

10. The coupler of claim 9 wherein the core portions are spaced apart in the region of interaction by a distance within the order of magnitude of the diameter of the core portion of one of the strands.

11. The coupler of claim 9 wherein the bases comprise blocks having generally planar confronting faces, and the strands are mounted in slots formed in the confronting faces of the blocks.

12. The coupler of claim 11 wherein each of the slots has an arcuately curved bottom wall.

13. The coupler of claim 11 wherein a plurality of fiber optic strands are mounted side-by-side on each of the bases, and the cladding is removed from the facing sides of the strands on the two blocks to provide light transfer between corresponding ones of the strands on the two blocks.

14. In a method of making a fiber optic directional coupler, the steps of: mounting first and second strands of single mode fiber optic material on first and second bases respectively, gradually, longitudinally removing the cladding on the outer side of each of the strands from zero to within a few microns of the core portion of the strand, and placing the bases and strands together with the core portions where the cladding has been removed in close facing proximity to form a region of interaction in which guided modes of the first and second strands interact through their evanescent fields to cause light to be transferred between the core portions of the two strands.

15. The method of claim 14 wherein slots are formed in the bases, the fiber optic strands are mounted in the slots, and material is removed simultaneously from the bases and the strands.

16. The method of claim 14 wherein the strands are affixed to the bases by cement which is heated and cooled gradually to cure the same.

17. In a fiber optic directional coupler: first and second bases having confronting fiber mounting surfaces, and a plurality of strands of single mode fiber optic material mounted side-by-side on each of the mounting surfaces, the cladding on the outer side of each strand being removed gradually longitudinally from zero to within a few microns of the core portion of the strand, and corresponding ones of the strands on the two bases being positioned in close proximity to each other where the cladding has been removed to form regions of interaction in which guided modes of the strands interact through their evanescent fields to cause light to be transferred between the core portions of said strands.

18. The coupler of claim 17 wherein the surfaces of the two bases converge toward the centers of the surfaces and diverge toward the edges of the surfaces, and the cladding is removed from the strands in a generally planar fashion.

19. In a method of making a fiber optic directional coupler the steps of: mounting a plurality of strands of single mode fiber optic material side-by-side on the mounting surfaces of two blocks, removing the cladding on the outer side of each of the strands gradually longitudinally from zero to within a few microns of the core portion of the strand, and placing the strands on the two blocks together with corresponding ones of the strands on the two blocks in close facing relationship where the cladding has been removed to form regions of interaction in which guided modes of the strands interact through their evanescent fields to cause light to be transferred between the corresponding strands.

20. The method of claim 19 wherein the mounting surfaces are generally convex, and the cladding is removed in a generally planar fashion to form the areas in which the cladding is removed gradually.

21. The method of claim 19 wherein the strands are affixed to the mounting surfaces by cement which is heated and cooled gradually to cure the same.

22. A fiber optic coupler, comprising:
first and second continuous, uninterrupted lengths of single mode optical fiber, each comprising:
a core, uniform in cross section throughout the fiber length, and a cladding surrounding said core, said cladding formed of material without abrupt rotational discontinuities, said cladding being sufficiently thin on one side only of said fiber exclusively at a selected portion of the length of said fiber to permit evanescent coupling of light from said one side; and
said lengths of optical fiber positioned to juxtapose said one side of said fibers at said selected portion of the length to provide evanescent coupling of light energy between the cores of said fibers.

23. A coupling device for coupling light between fiber optic elements, comprising a first elongated fiber optic transmission element, a second elongated fiber optic transmission element, each fiber optic transmission element having ends, being single mode, being rotationally non-symmetric at a selected location along the length thereof to provide means for enhanced, efficient, evanescent wave coupling in a selected portion of the periphery thereof at said selected location along the length thereof to couple light from said first element to said second element and including a core of uniform cross section and relatively high index of refraction and a cladding of relatively low index of refraction, said cladding, outside said selected location along the length thereof, being symmetrical about first and second axes of birefringence of said core.

24. The invention according to claim 23 wherein said first element includes a cladding at said selected location, said cladding at said selected location being of generally annular shape, and having cladding material removed between said core and the periphery of said cladding for lateral coupling.

25. The invention according to claim 23 wherein a lower fixture is provided with a trough into which said elements are placed for lateral coupling and an upper fixture being provided with trough into which said elements are placed for lateral coupling.

26. A coupling means for coupling light to an elongated fiber optic transmission element, comprising an elongated fiber optic transmission device having ends, being single mode, being rotationally non-symmetric at a selected location along the length thereof to provide means for enhanced, efficient evanescent wave coupling in a selected portion of the periphery thereof at said selected location along the length thereof to couple light from said device to said element and including a core of uniform cross section and relatively high index of refraction and a cladding of relatively low index of refraction, said core being eccentrically located with respect to said cladding at said selected location along the length thereof, so that said core is closer to the outer periphery of said cladding at said selected location along the length thereof than outside said location along the length thereof, said core substantially smaller, cross sectionally, than said cladding, and said cladding, outside said location along the length thereof, being devoid of abrupt rotational discontinuities.

27. A fiber optic coupler comprising:
first and second continuous, uninterrupted lengths of single mode optical fiber, each comprising:
a core uniform in cross section throughout the fiber length, and a cladding surrounding said core, said cladding formed of uniform material around the periphery of the outer cladding surface, said cladding being sufficiently thin on one side only of said fiber exclusively at a selected portion of the length of said fiber to permit evanescent coupling of light from said one side; and
said lengths of optical fiber positioned to juxtapose said one side of said fibers at said selected portion of the length to provide evanescent coupling of light energy between said cores.

28. A fiber optic coupler, comprising:
first and second continuous, uninterrupted lengths of single mode optical fiber, each comprising:

a core, uniform in cross section throughout the fiber length, and a cladding surrounding said core, said cladding being sufficiently thin on one side only of said fiber at a selected portion of the length of said fiber to permit evanescent coupling of light from said one side, said cladding, outside said selected portion of the length of said fiber, being symmetrical about first and second axes of birefringence of said core; and said lengths of optical fiber positioned to juxtapose said one side of said fibers at said selected portion of the length to provide evanescent coupling of light energy between said cores.

* * * * *